(12) United States Patent
Su et al.

(10) Patent No.: US 11,955,720 B2
(45) Date of Patent: Apr. 9, 2024

(54) BEAM ADJUSTMENT ASSEMBLY AND ANTENNA SYSTEM

(71) Applicant: Huawei Technologies Co., Ltd., Shenzhen (CN)

(72) Inventors: Huabing Su, Dongguan (CN); Lei Chen, Dongguan (CN); Runxiao Zhang, Dongguan (CN); Yixing Zeng, Shenzhen (CN); Fan Zhang, Shenzhen (CN); Ping Lv, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 118 days.

(21) Appl. No.: 17/843,419

(22) Filed: Jun. 17, 2022

(65) Prior Publication Data

US 2022/0320728 A1     Oct. 6, 2022

Related U.S. Application Data

(63) Continuation of application No. PCT/CN2020/137982, filed on Dec. 21, 2020.

(30) Foreign Application Priority Data

Dec. 20, 2019 (CN) .......................... 201911329504.7

(51) Int. Cl.
*H01Q 3/32* (2006.01)
*H04W 16/28* (2009.01)

(52) U.S. Cl.
CPC .............. *H01Q 3/32* (2013.01); *H04W 16/28* (2013.01)

(58) Field of Classification Search
CPC ........ H01Q 3/32; H01Q 25/002; H01Q 1/246; H04W 16/28; H01P 1/127; H01P 1/184
See application file for complete search history.

(56) References Cited

U.S. PATENT DOCUMENTS

2005/0184827 A1    8/2005   Pallone et al.
2011/0140805 A1*   6/2011   Liu .......................... H01P 1/184
                                                               333/161

(Continued)

FOREIGN PATENT DOCUMENTS

CN        103199322 A     7/2013
CN        203596399 U     5/2014

(Continued)

OTHER PUBLICATIONS

Jieming Liu, et al., "Research and Design of the Improved U Shape Dielectric Phase Shifter," Jun. 9, 2013, 94 pages.

*Primary Examiner* — Dieu Hien T Duong
(74) *Attorney, Agent, or Firm* — Conley Rose, P.C.

(57) ABSTRACT

A beam adjustment assembly includes a phase shifter and a connecting plate. The phase shifter includes a circuit board and main dielectric slabs configured to shift a phase. The circuit board is provided with a first strip and a second strip that are spaced. The first strip and the second strip are configured to respectively connect to radiating elements of an antenna. The connecting plate is slidably assembled on the circuit board and is configured to control an electrical connection between the first strip and the second strip. When sliding, the main dielectric slab can push the connecting plate to slide to control a quantity of radiating elements in the antenna system. The sliding of the main dielectric slab in the phase shifter is used as a driving mechanism of the connecting plate.

25 Claims, 5 Drawing Sheets

(56) References Cited

U.S. PATENT DOCUMENTS

2014/0028513 A1    1/2014   Deng et al.
2017/0005388 A1    1/2017   Hsu et al.
2019/0067770 A1    2/2019   Kim et al.

FOREIGN PATENT DOCUMENTS

| | | |
|---|---|---|
| CN | 203787537 U | 8/2014 |
| CN | 104269647 A | 1/2015 |
| CN | 105261835 A | 1/2016 |
| CN | 109193121 A | 1/2019 |
| CN | 208622946 U | 3/2019 |
| CN | 109638391 A | 4/2019 |
| CN | 109713406 A | 5/2019 |
| CN | 106921011 A | 7/2019 |
| CN | 110165342 A | 8/2019 |
| CN | 209329114 U | 8/2019 |
| CN | 209607890 U | 11/2019 |
| CN | 111180892 A | 5/2020 |
| EP | 3879628 A1 | 9/2021 |
| IN | 109921157 A | 6/2019 |
| WO | 2003063290 A2 | 7/2003 |
| WO | 2010131895 A2 | 11/2010 |
| WO | 2016173465 A1 | 11/2016 |
| WO | 2018120196 A1 | 7/2018 |

* cited by examiner

BEAM ADJUSTMENT ASSEMBLY AND ANTENNA SYSTEM

CROSS-REFERENCE TO RELATED APPLICATIONS

This is a continuation of International Patent Application No. PCT/CN2020/137982 filed on Dec. 21, 2020, which claims priority to Chinese Patent Application No. 201911329504.7 filed on Dec. 20, 2019. The disclosures of the aforementioned applications are hereby incorporated by reference in their entireties.

TECHNICAL FIELD

This application relates to the field of communication technologies, and in particular, to a beam adjustment assembly and an antenna system.

BACKGROUND

In mobile communication, a cell signal is implemented by using beam coverage of a base station antenna. Cells have different geographic and user characteristics. Therefore, a radiation direction of an antenna beam of a base station needs to be set and adjusted to achieve optimal cell coverage.

A beam width of an antenna is used to represent a coverage region of the antenna, and the beam width of the antenna includes a horizontal beam width and a vertical beam width. In actual application, coverage optimization is usually implemented by controlling a radiation direction and a beam width of an antenna beam. When a communication effect of an antenna needs to be optimized, a beam of the antenna needs to be adjusted. In a conventional technology, one adjustment manner is adjusting a beam angle, and the other manner is adjusting a beam width. The two manners complement each other to improve a coverage optimization effect. However, in the conventional technology, an adjustment mechanism for adjusting a beam width is relatively complex, occupies relatively large space, and encounters a relatively large resistance in adjustment. An adjustment effect is unsatisfactory.

SUMMARY

This application provides a beam adjustment assembly and an antenna system, to improve an adjustment effect of an antenna and optimize cell coverage.

According to a first aspect, an embodiment of this application provides a beam adjustment assembly. The beam adjustment assembly is configured to adjust a beam width of an antenna system. The beam adjustment assembly provided in this application includes two portions: a phase shifter and a connecting plate. The phase shifter includes a circuit board and main dielectric slabs configured to shift a phase. The circuit board is provided with a first strip and a second strip that are spaced. When cooperating with an antenna, the first strip and the second strip are configured to respectively connect to radiating elements of the antenna. The main dielectric slab is capable of sliding relative to the circuit board, and implementing a phase shift effect when sliding. During assembly, the connecting plate is slidably assembled on the circuit board and is configured to control an electrical connection between the first strip and the second strip. In this application, when sliding, the main dielectric slab can push the connecting plate to slide. In addition, when sliding to a first specified position in a first direction, the main dielectric slab pushes the connecting plate to connect the first strip to the second strip. When sliding to a second specified position in a second direction, the main dielectric slab pushes the connecting plate to disconnect the first strip from the second strip. The first direction is opposite to the second direction. When applied to the antenna system, the first strip is connected to a feeding unit of the antenna. Therefore, the radiating element connected to the first strip may be directly connected to the feeding unit. The second strip is not directly connected to the feeding unit of the antenna, and is connected to the first strip by using the connecting plate. When the connecting plate connects the first strip to the second strip, radiating elements working in the entire antenna system increase, beams are relatively concentrated, and a beam coverage area is relatively small. When the first strip is disconnected from the second strip, the radiating elements working in the antenna system decrease, the beams are scattered, and the beam coverage area is relatively large. It can be learned from the foregoing description that, in the beam adjustment assembly provided in this embodiment of this application, the sliding of the main dielectric slab in the phase shifter is used as a driving mechanism of the connecting plate. The main dielectric slab can drive the connecting plate to control connection and disconnection between the first strip and the second strip, to control working of the radiating elements in the antenna system and further implement beam adjustment. Compared with a beam adjustment assembly in a conventional technology, in this application, the connecting plate is integrated in the phase shifter. The connecting plate occupies relatively small space, is easy to operate, and encounters a relatively small resistance when being controlled.

In a specific feasible implementation solution, the circuit board is provided with a first sliding slot; and the connecting plate is slidably assembled in the first sliding slot, and is capable of sliding back and forth in the first direction and the second direction. The sliding connection between the connecting plate and the circuit board is implemented by using the sliding slot.

In a specific feasible implementation solution, the first sliding slot includes a linear portion and an inclined portion, an end of the first sliding slot that is close to the first strip is the inclined portion, and an end of the first sliding slot that is close to the second strip is the linear portion; when the connecting plate slides from the inclined portion to an end portion of the first sliding slot, the connecting plate connects the first strip to the second strip; and when the connecting plate slides from the linear portion to an end portion of the first sliding slot, the connecting plate is connected only to the second strip and is disconnected from the first strip. This ensures connection reliability.

In a specific feasible implementation solution, the inclined portion is a linear structure, and an included angle between the inclined portion and the linear portion is an obtuse angle; or the inclined portion is an arc inclined portion. Different sliding slot forms may all be applied to this application.

In a specific feasible implementation solution, the first sliding slot is a linear sliding slot, and a length direction of the first sliding slot is at an acute angle to a length direction of the circuit board. A sliding direction of the connecting plate is controlled by using different sliding slot forms.

In a specific feasible implementation solution, the connecting plate has a first end portion and a second end portion that are opposite to each other and an abutting side wall between the first end portion and the second end portion;

when the main dielectric slab slides in the first direction, the main dielectric slab is capable of abutting against the first end portion; when the main dielectric slab slides to the first specified position in the first direction, the connecting plate is located in the inclined portion, and the main dielectric slab abuts against the abutting side wall; and when the main dielectric slab slides in the second direction, the main dielectric slab is capable of abutting against the second end portion. Cooperation with the main dielectric slab is implemented by using the foregoing structure of the connecting plate.

In a specific feasible implementation solution, the connecting plate includes a circuit connecting plate configured to connect the first strip to the second strip and a locking plate fixedly connected to the circuit connecting plate in a detachable way, where the circuit connecting plate and the locking plate are arranged on two opposite sides of the circuit board; and the first end portion and the second end portion are two opposite end portions of the circuit connecting plate; and the abutting side wall is a side wall of the circuit connecting plate. This improves stability of cooperation between the connecting plate and the circuit board.

In a specific feasible implementation solution, the main dielectric slab is provided with a first pushing portion and a second pushing portion that are oppositely disposed and a pushing side wall configured to reach abutting contact with the abutting side wall; when the main dielectric slab slides in the first direction, the first pushing portion reaches abutting contact with the first end portion, and pushes the connecting plate; when the main dielectric slab slides to the first specified position in the first direction, the first pushing portion is released from abutting contact with the first end portion, and the pushing side wall reaches abutting contact with the abutting side wall and is locked to the connecting plate; and when the main dielectric slab slides in the second direction, the second pushing portion reaches abutting contact with the second end portion, and pushes the connecting plate to slide in the second direction. The cooperation between the main dielectric slab and the connecting plate is implemented by using the foregoing structure.

In a specific feasible implementation solution, the first end portion has a first slope guide surface, and the first pushing portion has a second slope guide surface cooperating with the first slope guide surface. This facilitates cooperation between the connecting plate and the main dielectric slab.

In a specific feasible implementation solution, the main dielectric slab is provided with an avoidance notch configured to cooperate with the connecting plate, and the first pushing portion and the second pushing portion are arranged on two opposite sides of the avoidance notch; when the connecting plate slides in the linear portion, the connecting plate is partially located in the avoidance notch; and when the connecting plate connects the first strip to the second strip, the connecting plate is located outside the avoidance notch. This improves reliability.

In a specific feasible implementation solution, in an extension direction of the inclined portion, a height of the second pushing portion is greater than a height of the first pushing portion; and the second pushing portion protrudes from the main dielectric slab. This improves reliability.

In a specific feasible implementation solution, the circuit board is provided with a second sliding slot; and the main dielectric slab is slidably assembled in the second sliding slot. The implements the connection between the connecting plate and the circuit board.

In a specific feasible implementation solution, the main dielectric slabs include a first main dielectric slab and a second main dielectric slab; and the first main dielectric slab and the second main dielectric slab are arranged on the two opposite sides of the circuit board. This improves reliability.

According to a second aspect, an antenna system is provided, where the antenna system includes a feeding unit, a plurality of radiating elements arranged in an array, and the beam adjustment assembly according to any one of the foregoing implementation solutions. The first strip is connected to the feeding unit, and the first strip and the second strip are respectively connected to at least ones of the plurality of radiating elements; when the connecting plate connects the first strip to the second strip, the radiating element connected to the second strip is connected to the feeding unit; and when the connecting plate disconnects the first strip from the second strip, the radiating element connected to the second strip is disconnected from the feeding unit. In the beam adjustment assembly provided in embodiments of this application, the sliding of the main dielectric slab in a phase shifter is used as a driving mechanism of the connecting plate. The main dielectric slab can drive the connecting plate to control connection and disconnection between the first strip and the second strip, to control working of the radiating elements in the antenna system and further implement beam adjustment. Compared with a beam adjustment assembly in a conventional technology, in this application, the connecting plate is integrated in the phase shifter. The connecting plate occupies relatively small space, is easy to operate, and encounters a relatively small resistance when being controlled.

DESCRIPTION OF EMBODIMENTS

For ease of understanding, an application scenario of a beam adjustment assembly provided in embodiments of this application is first described. The beam adjustment assembly provided in the embodiments of this application is applied to an antenna system, and is specifically configured to adjust a beam of an antenna in the antenna system. In a conventional technology, when a beam of an antenna is adjusted, a beam angle of the antenna is adjusted in one manner, and a beam width is adjusted in the other manner. However, in the conventional technology, an adjustment mechanism for adjusting the beam width is relatively complex, occupies relatively large space, and encounters a relatively large resistance in adjustment. An adjustment effect is unsatisfactory. Therefore, an embodiment of this application provides a beam adjustment assembly. The following details the beam adjustment assembly with reference to specific drawings and embodiments.

Figure 1:
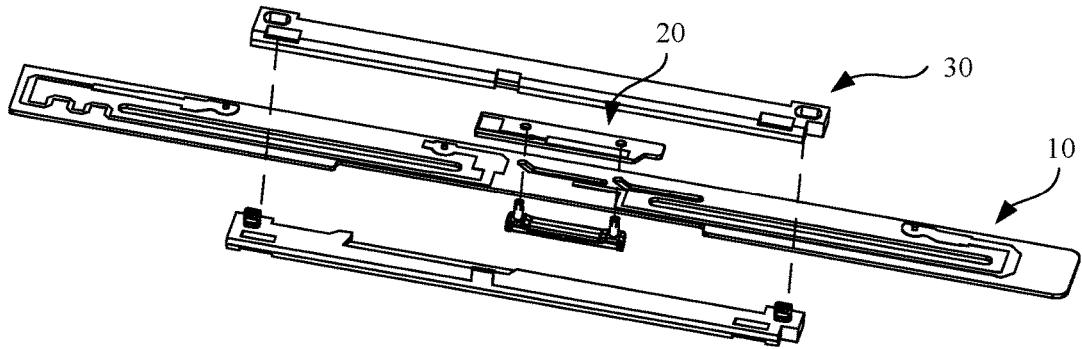
FIG. 1 is a schematic exploded view of a beam adjustment assembly according to an embodiment of this application.

For example, FIG. 1 is a schematic exploded view of a beam adjustment assembly according to an embodiment of this application. It can be seen from FIG. 1 that, the beam adjustment assembly provided in this embodiment of this application includes a circuit board 10, main dielectric slabs 30, and a connecting plate 20. There are two main dielectric slabs 30. The two main dielectric slabs 30 are arranged on two opposite sides of the circuit board 10, and may be assembled on the circuit board 10 along dashed lines shown in FIG. 1. The connecting plate 20 includes two portions of structure. The two portions of structure are arranged on the two opposite sides of the circuit board 10, and may also be assembled on the circuit board 10 along dashed lines shown in FIG. 1.

Figure 2:
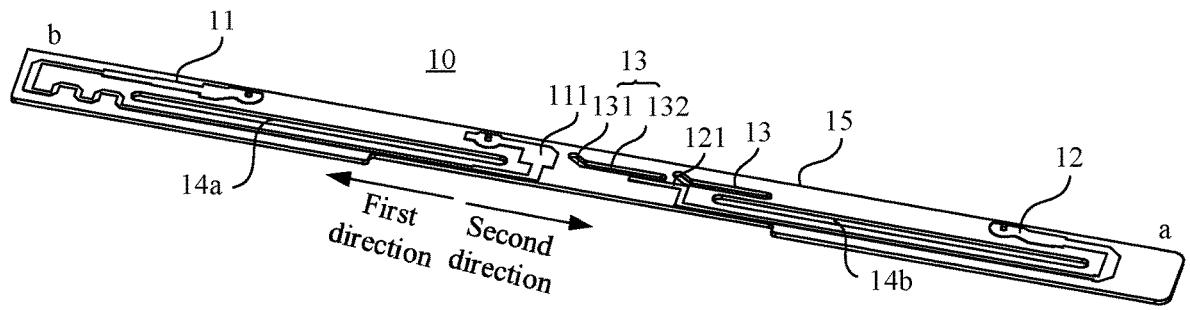
FIG. 2 is a schematic diagram of a structure of a circuit board according to an embodiment of this application.

FIG. 2 is a schematic diagram of a structure of the circuit board 10 according to an embodiment of this application. The circuit board 10 provided in this embodiment of this application is a long strip-shaped circuit board 10. The circuit board 10 is provided with two strips that are spaced. For ease of description, the strips are respectively named a first strip 11 and a second strip 12. As shown in FIG. 2, the first strip 11 and the second strip 12 are arranged in a length direction of the circuit board 10. A first end a and a second end b of the circuit board 10 are used as reference. The second strip 12 has two opposite ends. An end portion close to the first end a of the circuit board 10 is a first connecting end, and an end portion close to a middle position of the circuit board 10 is a second connecting end 121. The first connecting end of the second strip 12 may be configured to connect to a radiating element of an antenna, for example, connect to one radiating element, or connect to at least two radiating elements, such as two or three radiating elements. A specific case may be determined according to a requirement. The second connecting end 121 of the second strip 12 is configured to cooperate with the connecting plate 20 shown in FIG. 1. Still referring to FIG. 2, the first strip 11 has two opposite ends: a first connecting end close to the second end b of the circuit board 10 and a second connecting end 111 close to the middle position of the circuit board 10. The first connecting end of the first strip 11 may be configured to connect to a radiating element of the antenna, for example, connect to one radiating element, or connect to at least two radiating elements, such as two or three radiating elements. A specific case may be determined according to a requirement. The second connecting end 111 of the first strip 11 is configured to cooperate with the connecting plate 20 shown in FIG. 1.

Still referring to FIG. 2, the circuit board 10 is provided with sliding slots configured to cooperate with the connecting plate and the main dielectric slab. For ease of description, the sliding slot cooperating with the connecting plate is named a first sliding slot 13, and the sliding slot cooperating with the main dielectric slab is named a second sliding slot.

The first sliding slot 13 is first described. Two first sliding slots 13 are used as examples in FIG. 2. However, a quantity of first sliding slots 13 is not limited in this embodiment of this application. For example, one first sliding slot, three first sliding slots, or another different quantity of first sliding slots may be applied to this application. The two first sliding slots 13 shown in FIG. 2 are used only as examples for description. The two first sliding slots 13 are spaced in the length direction of the circuit board 10, and the two first sliding slots 13 are located in a region between the second strip 12 and the first strip 11. In this embodiment of this application, structures of the two first sliding slots 13 are the same. The following uses one first sliding slot 13 as an example for description. As shown in FIG. 2, the first sliding slot 13 includes two portions: a linear portion 132 and an inclined portion 131. An end of the first sliding slot 13 that is close to the second strip 12 is the linear portion 132, and an end of the first sliding slot 13 that is close to the first strip 11 is the inclined portion 131. By using the first end a and the second end b of the circuit board 10 as reference, a side of the first sliding slot 13 that is close to the first end a is the linear portion 132, and a side of the first sliding slot 13 that is close to the second end b is the inclined portion 131. For ease of describing the structure of the first sliding slot 13, a long side edge of the circuit board 10 is defined, and the long side edge is a long side edge close to the first sliding slot 13. Still referring to FIG. 2, both the linear portion 132 and the inclined portion 131 are linear structures. The linear portion 132 may or may not be parallel to the long side edge of the circuit board 10, and the inclined portion 131 is bent towards a direction of the long side edge. As shown in FIG. 2, an included angle between the inclined portion 131 and the linear portion 132 is an obtuse angle. For example, the included angle is 120°, 150°, 160°, or another different angle. An arc transition may be used at a joint between the linear portion 132 and the inclined portion 131, so that the connecting plate cooperating with the linear portion 132 and the inclined portion 131 can smoothly slide from the inclined portion 131 to the linear portion 132. When the connecting plate cooperates with the circuit board 10, the connecting plate is slidably assembled in the first sliding slot 13, and can slide back and forth in a first direction and a second direction. As shown in FIG. 2, both the first direction and the second direction are parallel to the length direction of the circuit board 10, and the first direction and the second direction are opposite to each other.

It should be understood that, the structure of the first sliding slot 13 provided in this embodiment of this application is not limited to the manner shown in FIG. 2. The inclined portion 131 may alternatively use an arc structure.

When the inclined portion 131 is an arc structure, an inner concave side of the inclined portion 131 faces or is away from the long side edge of the board.

In addition to the manner shown in FIG. 2, the structure of the first sliding slot 13 may include another structural form. For example, the first sliding slot 13 is a linear slot, and the first sliding slot 13 is disposed in a manner in which the first sliding slot 13 is inclined relative to the long side edge. For example, a length direction of the first sliding slot 13 is at an acute angle to the length direction of the circuit board 10. Alternatively, the first sliding slot 13 as a whole may be an arc sliding slot, and an inner concave surface or an outer convex surface of the first sliding slot 13 faces the long side edge of the circuit board 10.

Still referring to FIG. 2, two second sliding slots are used as examples in FIG. 2. However, a quantity of second sliding slots is not limited in this embodiment of this application. For example, one second sliding slot, three second sliding slots, or another different quantity of second sliding slots may be applied to this application. Two second sliding slots 14a and 14b shown in FIG. 2 are used only as examples for description. The two second sliding slots 14a and 14b are arranged in the length direction of the circuit board 10, and a length direction of each second sliding slot follows the length direction of the circuit board 10. Still referring to FIG. 2, the first connecting end and the second connecting end 111 of the first strip 11 are bent, and the second sliding slot 14a is disposed in a region enclosed by the first strip 11. The first connecting end of the second strip 12 is bent, and the second sliding slot 14b is disposed in a region enclosed by the second strip 12. It should be understood that, the foregoing is merely a specific example of the second sliding slots 14a and 14b, and specific positions for disposing the second sliding slots 14a and 14b are not specifically limited in this application. The main dielectric slab may be slidably assembled in the second sliding slots 14a and 14b, and can slide back and forth in the first direction and the second direction.

It should be understood that, the circuit board 10 provided in this embodiment of this application may be a printed circuit board or another common circuit board. This is not specifically limited herein. When a printed circuit board is used, the second strip 12 and the first strip 11 may be metal layers or metal routes of the printed circuit board.

Figure 3:
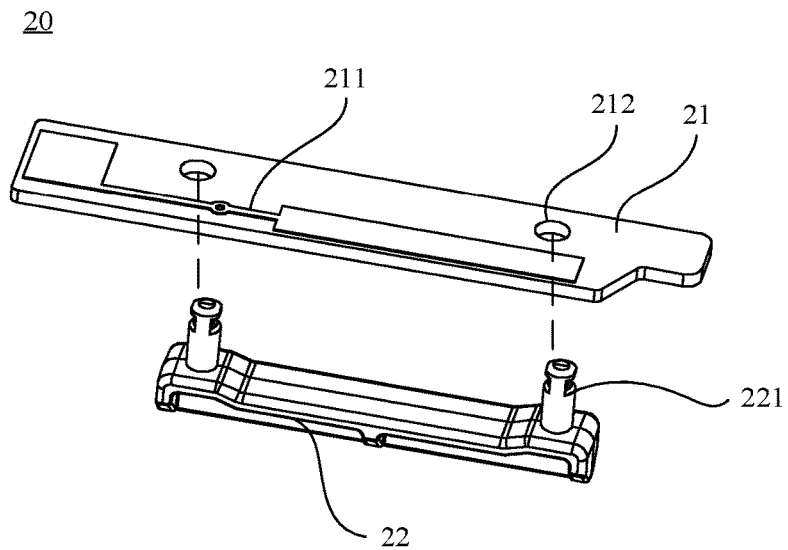
FIG. 3 is a schematic exploded view of a connecting plate according to an embodiment of this application.

For example, FIG. 3 is a schematic diagram of a specific structure of the connecting plate 20 according to an embodiment of this application. As shown in FIG. 3, the two portions of the connecting plate 20 are respectively a circuit connecting plate 21 and a locking plate 22. The circuit connecting plate 21 is provided with a connection circuit 211 configured to connect the second strip 12 to the first strip 11. The circuit connecting plate 21 is provided with two locking holes 212, and the locking plate 22 is provided with two buckles 221. During assembly, the buckles 221 may be inserted into the locking holes 212 in a direction of dashed lines in FIG. 3. The circuit connecting plate 21 is fixedly connected to the locking plate 22 to form the connecting plate 20. With reference to the structures of the circuit board 10 and the connecting plate 20 shown in FIG. 1, FIG. 2, and FIG. 3, when the connecting plate 20 is assembled, length directions of the circuit connecting plate 21 and the locking plate 22 are the same as the length direction of the circuit board 10. The circuit connecting plate 21 and the locking plate 22 are arranged on two opposite surfaces of the circuit board 10. The two buckles 221 of the locking plate 22 are inserted into the two first sliding slots in one-to-one correspondences. End portions configured to be buckled into the locking holes 212 protrude from the circuit board 10. Buckling ends of the buckles 221 are buckled into the locking holes 212 of the circuit connecting plate 21. The connecting plate 20 is assembled with the circuit board 10. The connection circuit 211 of the circuit connecting plate 21 fits with a surface of the circuit board 10 that is provided with the second strip 12 and the first strip 11. The connecting plate 20 can slide in the first sliding slot by using the buckles 221, to implement the sliding connection between the connecting plate 20 and the circuit board 10.

The cooperation between the circuit connecting plate 21 and the locking plate 22 shown in FIG. 3 is merely a specific example, and the circuit connecting plate 21 may be connected to the locking plate 22 in another connection manner. For example, the buckles 221 are disposed on the circuit connecting plate 21, and the locking holes 212 are disposed on the locking plate 22. A principle thereof is the same as the foregoing principle. Alternatively, the circuit connecting plate 21 may be fixedly connected to the locking plate 22 by using bolts or screws.

Figure 4:
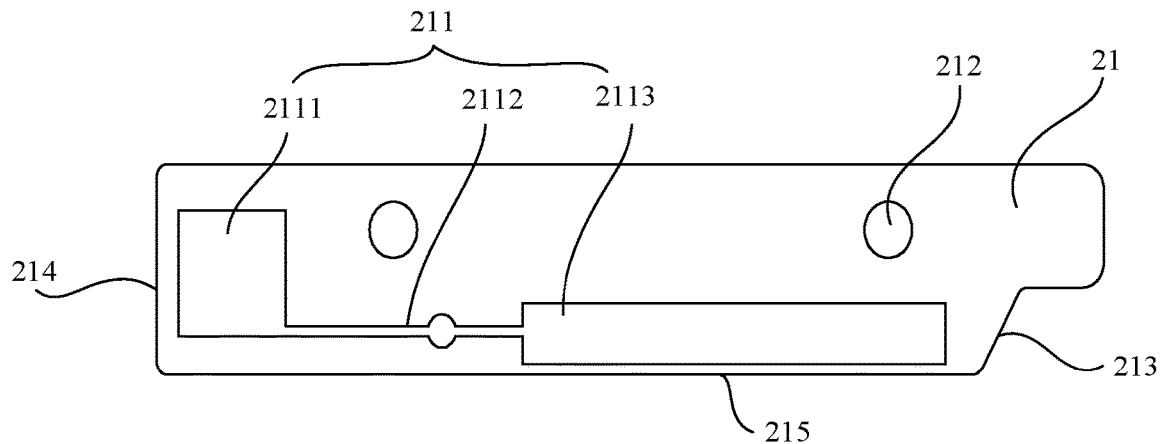
FIG. 4 is a schematic diagram of a structure of a circuit connecting plate according to an embodiment of this application.

For example, FIG. 4 is a schematic diagram of a specific structure of the circuit connecting plate 21. The connection circuit 211 on the circuit connecting plate 21 includes a second cooperation end 2111, a first cooperation end 2113, and a connecting line 2112 connecting the second cooperation end 2111 to the first cooperation end 2113. As shown in FIG. 4, the circuit connecting plate 21 has a first end portion 213 and a second end portion 214 that are opposite to each other and an abutting side wall 215 between the first end portion 213 and the second end portion 214. The connection circuit 211 is disposed in the length direction of the circuit connecting plate 21, the second cooperation end 2111 is close to the first end portion 214, and the first cooperation end 2113 is close to the second end portion 213. Still referring to FIG. 4, the second cooperation end 2111 is a rectangular metal layer or metal sheet, or an oval, circular, or irregular-shaped metal layer or metal sheet. The first cooperation end 2113 is a rectangular metal layer or metal sheet, and a length direction of the first cooperation end 2113 is the same as the length direction of the circuit connecting plate 21. A shape of the first cooperation end 2113 is not limited to the rectangular shape shown in FIG. 4, but may alternatively be an oval shape or another shape with a specific length.

Figure 5:
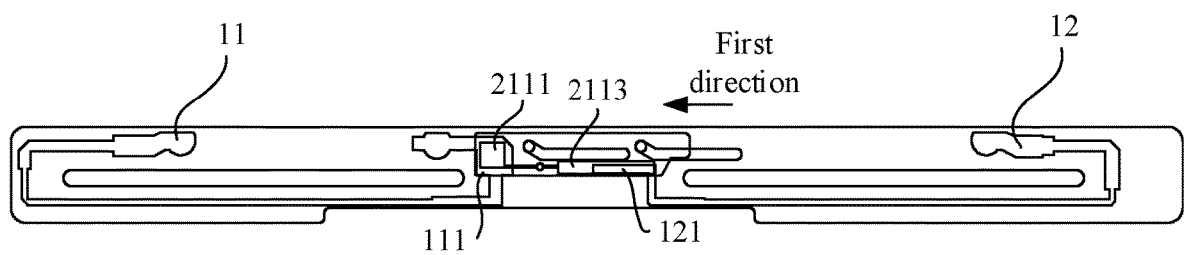
FIG. 5 is a schematic diagram of cooperation between a circuit connecting plate and a circuit board according to an embodiment of this application.
Figure 6:
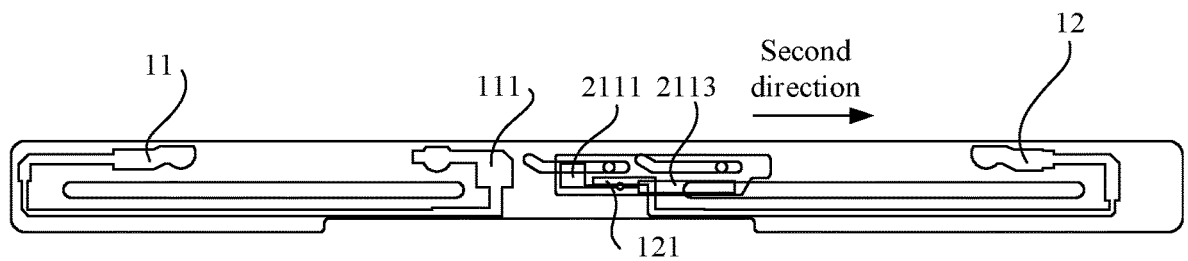
FIG. 6 is a schematic diagram of cooperation between a circuit connecting plate and a circuit board according to an embodiment of this application.

FIG. 5 shows that the connecting plate connects the second strip 12 to the first strip 11. FIG. 6 shows that the connecting plate disconnects the second strip 12 from the first strip 11. First, referring to FIG. 5, when the connecting plate slides from the inclined portion to an end portion of the first sliding slot, the first cooperation end 2113 is electrically connected to the second connecting end 121 of the second strip 12, the second cooperation end 2111 is electrically connected to the second connecting end 111 of the first strip 11, and the connecting plate connects the second strip 12 to the first strip 11. As shown in FIG. 6, when the connecting plate slides in the linear portion to an end portion of the first sliding slot, the second cooperation end 2111 is disconnected from the second connecting end 111 of the first strip 11. Because the first cooperation end 2113 has a specific length, the first cooperation end 2113 is still electrically connected to the second connecting end 121 of the second strip 12, and the connecting plate is connected only to the second strip 12 and disconnected from the first strip 11.

It should be understood that, the connecting plate provided in this embodiment of this application is not limited to the structure shown in FIG. 3 and FIG. 4. The connecting plate may alternatively include only the circuit connecting plate 21, and the circuit connecting plate 21 is slidably assembled on the circuit board. However, regardless of which manner is used, the connecting plate provided in this embodiment of this application includes structures such as the first end portion 213, the second end portion 214, and the abutting side wall 215. The first end portion 213, the second end portion 214, and the abutting side wall 215 are configured to cooperate with the main dielectric slab, so that the main dielectric slab pushes, by using the foregoing structures, the connecting plate to slide in the first direction and the second direction. For example, when the main dielectric slab slides in the first direction, the main dielectric slab may abut against the first end portion 213. When the main dielectric slab slides to a first specified position in the first direction, the connecting plate is located in the inclined portion, and the main dielectric slab abuts against the abutting side wall 215. When the main dielectric slab slides in the second direction, the main dielectric slab may abut against the second end portion 214. Cooperation with the main dielectric slab is implemented by using the foregoing structure of the connecting plate. The following details a specific structure of the main dielectric slabs with reference to FIG. 7.

Figure 7:
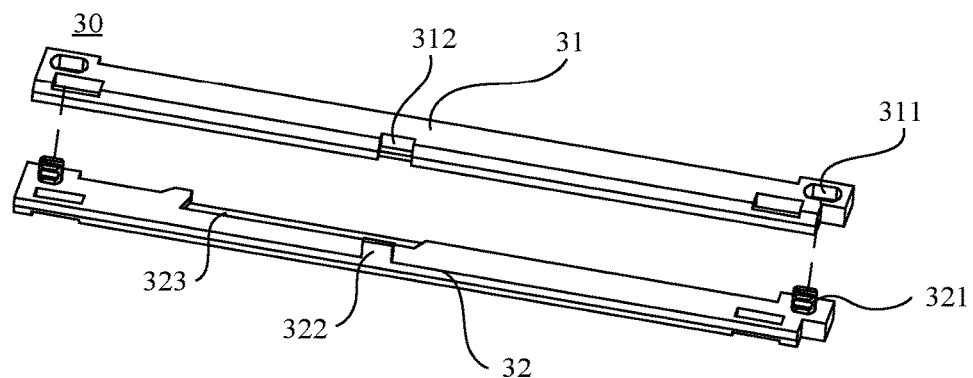
FIG. 7 is a schematic exploded view of a main dielectric slab according to an embodiment of this application.

For example, FIG. 7 shows a structure of the main dielectric slabs provided in this embodiment of this application. The main dielectric slabs include a first main dielectric slab 31 and a second main dielectric slab 32. The first main dielectric slab 31 and the second main dielectric slab 32 are cuboid structures. Length directions of the first main dielectric slab 31 and the second main dielectric slab 32 are the same as the length direction of the circuit board. Two end portions of the first main dielectric slab 31 in the length direction are respectively provided with locking holes 311. Two end portions of the second main dielectric slab 32 in the length direction are respectively provided with two buckles 321 cooperating with the locking holes 311. A middle position of the first main dielectric slab 31 is provided with a clamping groove 312, and a middle position of the second main dielectric slab 32 is correspondingly provided with a buckle 322. A surface of the first main dielectric slab 31 that faces the second main dielectric slab 32 is provided with a first driving structure (not shown in the figure), and a surface of the second main dielectric slab 32 that faces the first main dielectric slab 31 is provided with a second driving structure 323. When the first main dielectric slab 31 and the second main dielectric slab 32 are assembled on the circuit board, refer to the circuit board and the main dielectric slabs shown in FIG. 1, FIG. 2, and FIG. 7. The first main dielectric slab 31 and the second main dielectric slab 32 are arranged on the two opposite sides of the circuit board 10. The two buckles 321 of the second main dielectric slab 32 are inserted into the two second sliding slots 14a and 14b of the circuit board 10 in one-to-one correspondences. Buckling end portions of the buckles 321 for cooperating with the locking holes 311 protrude from the circuit board 10. For covering and buckling of the first main dielectric slab 31, the buckles 321 are buckled into the locking holes 311 of the first main dielectric slab 31, so that the first main dielectric slab 31 and the second main dielectric slab 32 are connected to the circuit board 10. In addition, the first main dielectric slab 31 and the second main dielectric slab 32 slide in the second sliding slots 14a and 14b by using the buckles 321, to move back and forth in the first direction and the second direction. After the first main dielectric slab 31 and the second main dielectric slab 32 are assembled on the circuit board 10, the connecting plate 20 is pressed on the circuit board 10 by using the first dielectric slab 31 and the second dielectric slab 31.

The cooperation between the first main dielectric slab 31 and the second main dielectric slab 32 shown in FIG. 7 is merely a specific example. Alternatively, the first main dielectric slab 31 may be connected to the second main dielectric slab 32 in another connection manner. For example, buckles are disposed on the first main dielectric slab 31, and locking holes are disposed on the second main dielectric slab 32. A principle thereof is the same as the foregoing principle. Alternatively, the first main dielectric slab 31 may be fixedly connected to the second main dielectric slab 32 by using bolts or screws.

Figure 8:
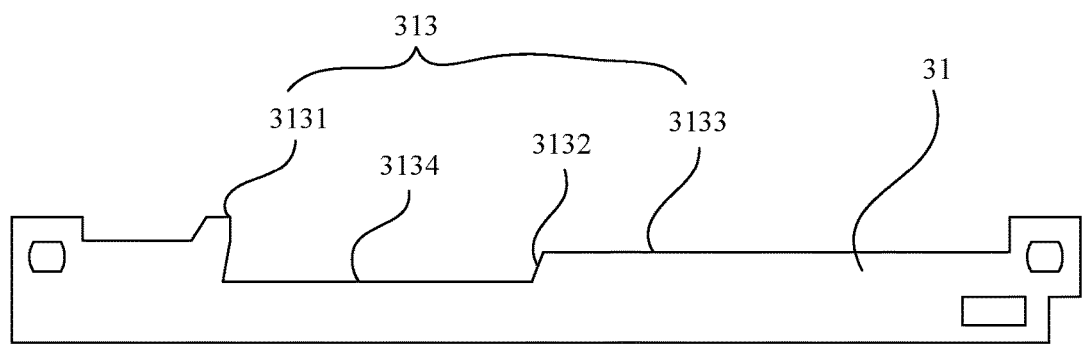
FIG. 8 is a schematic diagram of a driving mechanism of a first main dielectric slab according to an embodiment of this application.

FIG. 8 is a schematic diagram of a structure of a side of the first main dielectric slab 31 that faces the circuit board. The surface of the first main dielectric slab 31 that faces the second main dielectric slab 32 is provided with a first driving structure 313, including a first pushing portion 3132 and a second pushing portion 3131 that are oppositely disposed. The first pushing portion 3132 and the second pushing portion 3131 are arranged in the length direction of the first main dielectric slab 31. When the first main dielectric slab 31 is assembled on the circuit board, the first pushing portion 3132 is close to a first end portion of the circuit board, and the second pushing portion 3131 is close to a second end portion of the circuit board. Referring to FIG. 4 and FIG. 8, the first end portion 213 of the circuit connecting plate 21 has a first slope guide surface, and the first pushing portion 3132 has a second slope guide surface cooperating with the first slope guide surface. When the circuit connecting plate 21 is located in an avoidance notch 3134, the first slope guide surface reaches abutting contact with the second slope guide surface. Still referring to FIG. 8, a height of the second pushing portion 3131 is greater than a height of the first pushing portion 3132, and the second pushing portion 3131 protrudes from the first main dielectric slab 31. Still referring to FIG. 8, the first main dielectric slab 31 is provided with the avoidance notch 3134 configured to cooperate with the circuit connecting plate 21. The first pushing portion 3132 and the second pushing portion 3131 are arranged on two opposite sides of the avoidance notch 3134 during arrangement. One side of the first pushing portion 3132 has the avoidance notch 3134, and the other side thereof has a pushing side wall 3133. The pushing side wall 3133 is configured to cooperate with the abutting side wall 215 of the circuit connecting plate 21. For ease of illustrating the cooperation between the circuit connecting plate 21 and the first main dielectric slab 31, the following provides a description by using structures shown in FIG. 9 to FIG. 13 as examples. For example, FIG. 9 to FIG. 13 show a process of disconnecting the second strip 12 from the first strip 11.

Figure 9:
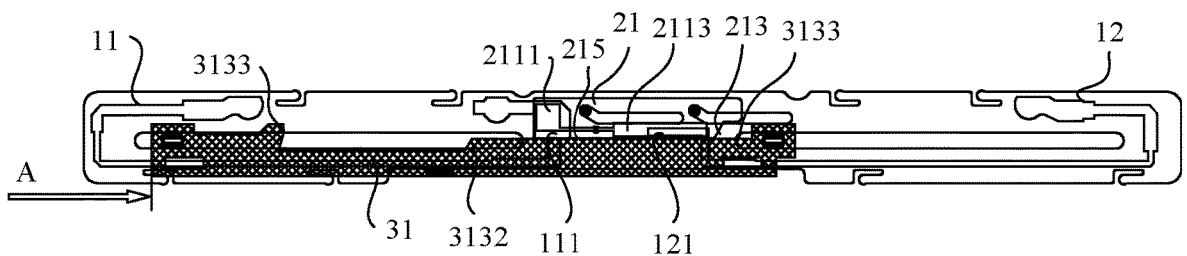
FIG. 9 is a schematic diagram of cooperation between a first main dielectric slab sliding to a position A and a circuit connecting plate according to an embodiment of this application.
Figure 10:
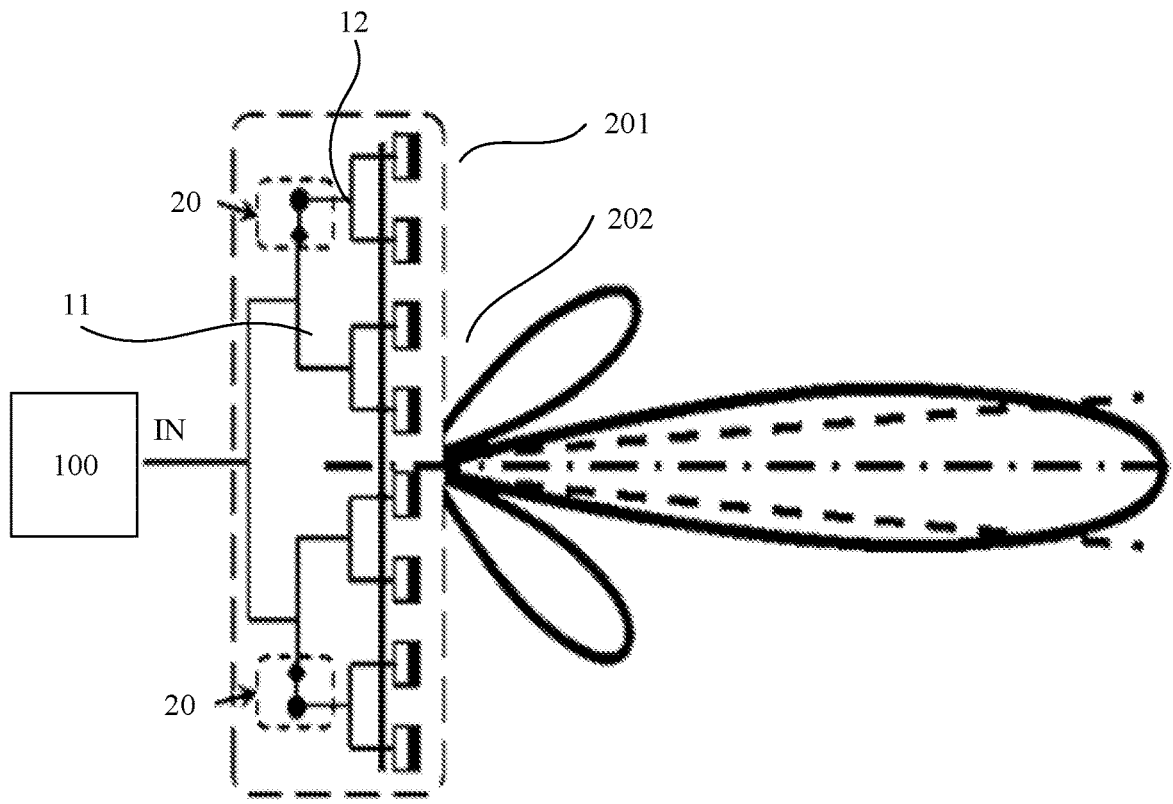
FIG. 10 is a diagram of a beam in an antenna system that is generated when a first main dielectric slab slides to a position A according to an embodiment of this application.

First, referring to FIG. 9, when the first main dielectric slab 31 slides to a position A, the pushing side wall 3133 of the first main dielectric slab 31 reaches abutting contact with the abutting side wall 215 of the circuit connecting plate 21. The circuit connecting plate 21 is located at an end portion of the inclined portion of the first sliding slot. The first cooperation end 2113 is electrically connected to the second connecting end 121 of the second strip 12. The second cooperation end 2111 is electrically connected to the second connecting end 111 of the first strip 11. The circuit connecting plate 21 connects the second strip 12 to the first strip 11. For example, FIG. 10 is a schematic diagram of a beam in a corresponding antenna system. It can be seen from FIG. 10 that, when the beam adjustment assembly is applied to the antenna system, the first strip 11 is connected to a feeding unit 100 of the antenna. Therefore, a radiating element 202 connected to the first strip 11 may be directly connected to the feeding unit 100. The second strip 12 is connected to the first strip 11 by using the connecting plate 20. When the connecting plate 20 connects the second strip 12 to the first strip 11, a radiating element 201 connected to the second strip 12 is connected to the feeding unit 100. Radiating elements working in the entire antenna system increase, beams are concentrated, and a beam coverage area is small.

Figure 11:
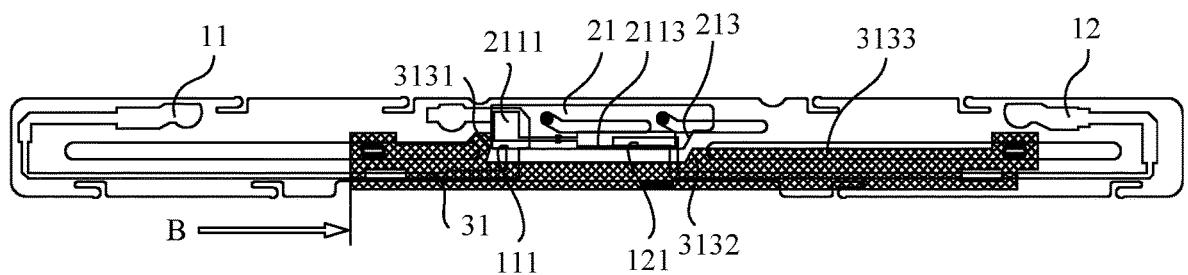
FIG. 11 is a schematic diagram of cooperation between a first main dielectric slab sliding to a position B and a circuit connecting plate according to an embodiment of this application.

As shown in FIG. 11, when the first main dielectric slab 31 slides to a position B, the second pushing portion 3131 of the first main dielectric slab 31 reaches abutting contact with the second end portion of the circuit connecting plate 21. In this case, the circuit connecting plate 21 is located above the avoidance notch of the first main dielectric slab 31.

Figure 12:
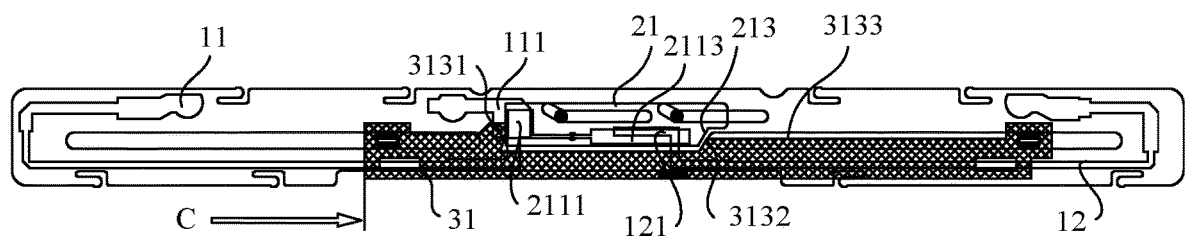
FIG. 12 is a schematic diagram of cooperation between a first main dielectric slab sliding to a position C and a circuit connecting plate according to an embodiment of this application.

As shown in FIG. 12, the first main dielectric slab 31 continues to be pushed in the second direction. When the first main dielectric slab 31 moves to a position C, the second pushing portion 3131 pushes the circuit connecting plate 21 to slide to the joint between the inclined portion and the linear portion of the first sliding slot. The circuit connecting plate 21 falls into the avoidance notch. The second cooperation end 2111 starts to be released from the contact with the second connecting end 111 of the first strip 11. The first cooperation end 2113 is still connected to the second connecting end 121 of the second strip 12.

Figure 13:
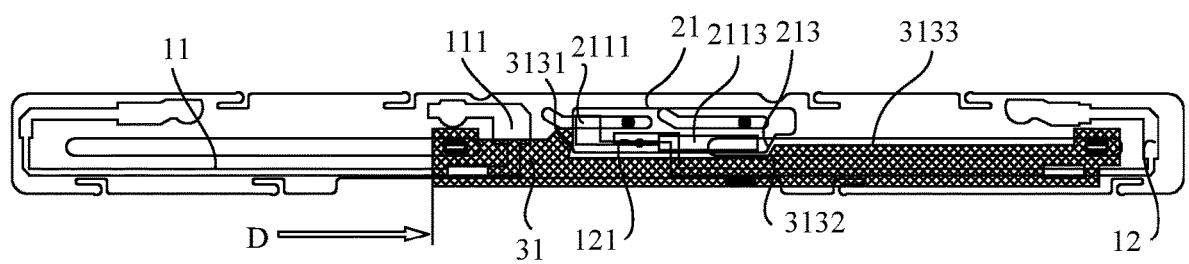
FIG. 13 is a schematic diagram of cooperation between a first main dielectric slab sliding to a position D and a circuit connecting plate according to an embodiment of this application.
Figure 14:
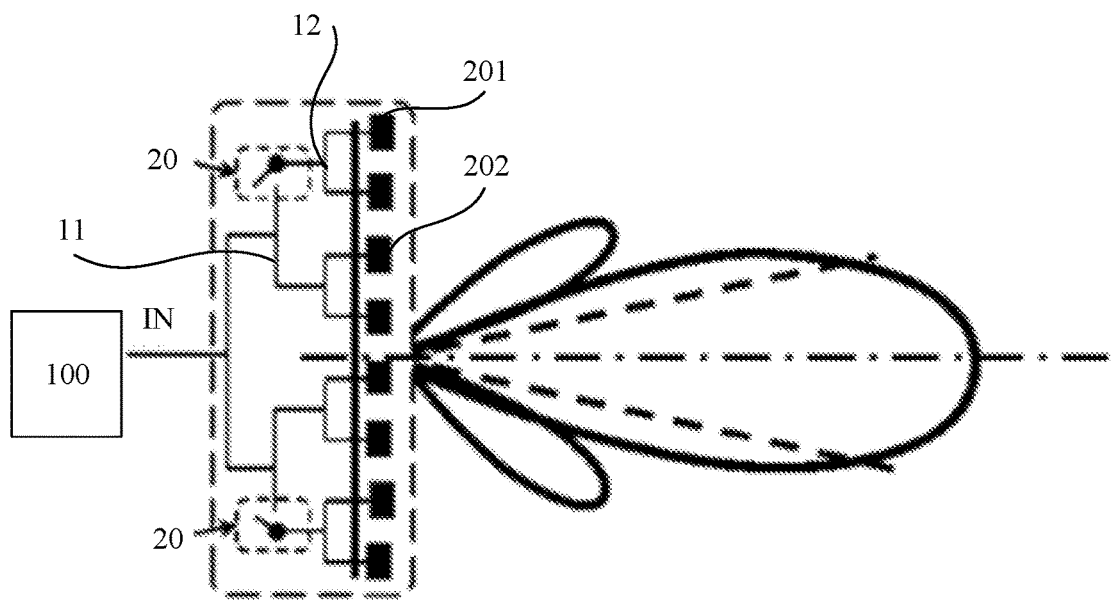
FIG. 14 is a diagram of a beam in an antenna system that is generated when a first main dielectric slab slides to a position D according to an embodiment of this application.

As shown in FIG. 13, the first main dielectric slab 31 continues to be pushed in the second direction. When the first main dielectric slab 31 slides to a position D (the second specified position), the second pushing portion 3131 of the first main dielectric slab 31 pushes the circuit connecting plate 21 to slide from the linear portion of the first sliding slot to an end portion away from the inclined portion. The second cooperation end 2111 is disconnected from the second connecting end 111 of the first strip 11, and the first cooperation end 2113 is still connected to the second connecting end 121 of the second strip 12. A corresponding effect in the antenna system is shown in FIG. 14. When the second strip 12 is disconnected from the first strip 11, the radiating element 201 connected to the second strip 12 is disconnected from the feeding unit 100. Only the radiating element 202 connected to the first strip 11 works in the antenna system. Compared with a case in which the radiating element 201 and the radiating element 202 work simultaneously, working radiating elements are reduced, the beams are relatively scattered, and a beam coverage area is relatively large.

When the second strip 12 cooperates with the first strip 11, it is equivalent to a reverse movement of the foregoing movement. To be specific, the first main dielectric slab 31 moves from the position D to the position A (slides in the first direction). In a sliding process, the first pushing portion 3132 cooperates with the first end portion 213 of the circuit connecting plate 21 to push the circuit connecting plate 21 to slide from the linear portion in the first sliding slot to an end portion of the inclined portion. In this way, the second cooperation end 2111 is electrically connected to the second connecting end 111 of the first strip 11. It should be understood that, during sliding in the first direction, when the first main dielectric slab 31 slides to the position C shown in FIG. 12, the first pushing portion 3132 reaches abutting contact with the first end portion 213 and pushes the connecting plate. Because the first end portion 213 of the circuit connecting plate 21 has the first slope guide surface, and the corresponding first pushing portion 3132 also has the second slope guide surface, when the first main dielectric slab 31 continues to slide, the first pushing portion 3132 starts to be released from the abutting contact with the first end portion 213. The circuit connecting plate 21 slides to the inclined portion of the first sliding slot, and the circuit connecting plate 21 starts to slide out of the avoidance notch. When the first main dielectric slab 31 slides to the position B in the first direction, the circuit connecting plate 21 slides to an end portion position of the inclined portion of the first sliding slot. When the first main dielectric slab 31 continues to slide, the pushing side wall 3133 of the first main dielectric slab 31 reaches abutting contact with the abutting side wall 215, and is locked to the connecting plate. As shown in FIG. 9, when the circuit connecting plate 21 connects the second strip 12 to the first strip 11, the circuit connecting plate 21 is located outside the avoidance notch, and is locked to this position through the abutting contact between the pushing side wall 3133 and the abutting side wall 215. When the circuit connecting plate 21 is located at the position shown in FIG. 9, the first main dielectric slab 31 may still continue to slide in the first direction, to implement a phase-shift effect.

It can be learned from the foregoing description that, in the beam adjustment assembly provided in this embodiment of this application, the main dielectric slab of the phase shifter cooperates with the connecting plate, so that the main dielectric slab and the connecting plate become linked components, and a driving apparatus in the phase shifter for driving the main dielectric slab to slide is used as a power output apparatus. In this way, phase shifting and beam adjustment are integrated together. Sliding of the main dielectric slab and the connecting plate is implemented by using one driving apparatus (the driving apparatus of the main dielectric slab in the phase shifter), phase shifting and beam adjustment are integrated into the phase shifter, and no additional beam adjustment assembly is required. In addition, during beam adjustment in this embodiment of this application, only friction between the connecting plate and the circuit board needs to be overcome, and a resistance is low. The beam adjustment assembly is applicable to a scenario in which a single motor simultaneously drives a plurality of phase shifters, features fatigue resistance and good stability, requires no additional transmission for driving, and has low costs.

An embodiment of this application provides an antenna system. As shown in FIG. 10 and FIG. 14, the antenna system includes a feeding unit 100, a plurality of radiating elements 201 and 202 arranged in an array, and the beam adjustment assembly according to any one of the foregoing embodiments. The first strip 11 is directly connected to the feeding unit 100. In addition, the first strip 11 is connected to a plurality of radiating elements 202, and the second strip 12 is connected to a plurality of radiating elements 201. When the connecting plate 20 connects the second strip 12 to the first strip 11, the radiating elements 201 connected to the second strip 12 are connected to the feeding unit 100. When the connecting plate disconnects the second strip 12 from the first strip 11, the radiating elements 201 connected to the second strip 12 are disconnected from the feeding unit 100. In the beam adjustment assembly provided in this embodiment of this application, the sliding of a main dielectric slab in a phase shifter is used as a driving mechanism of the connecting plate. The main dielectric slab can drive the connecting plate to control connection and disconnection between the first strip 11 and the second strip 12, to control working of the radiating elements in the antenna system and further implement beam adjustment. In this application, the connecting plate is integrated in the phase shifter. The connecting plate occupies relatively small space, is easy to operate, and encounters a relatively small resistance when being controlled.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A beam adjustment assembly, comprising:
a phase shifter comprising:
  a circuit board comprising a first strip and a second strip that are spaced apart from each other and that are configured to respectively connect to radiating elements of an antenna; and
  main dielectric slabs slidably coupled to the circuit board and configured to slide in a first direction to a first position and to slide in a second direction to a second position, wherein the first direction is opposite the second direction; and
a connecting plate slidably disposed on the circuit board and configured to control an electrical connection between the first strip and the second strip,
wherein one or more of the main dielectric slabs are configured to:
  push the connecting plate to connect the first strip to the second strip when the main dielectric slabs are slidingly moved in the first direction to the first position; and
  push the connecting plate to disconnect the first strip from the second strip when the main dielectric slabs are slidingly moved in the second direction to the second position.

2. The beam adjustment assembly of claim 1, wherein the circuit board further comprises a first sliding slot, wherein the connecting plate is slidably disposed in the first sliding slot, and wherein the connecting plate is configured to slide in the first direction and the second direction in the first sliding slot.

3. The beam adjustment assembly of claim 2, wherein the first sliding slot comprises:
a first end portion that is proximate to the second strip and that comprises a linear portion; and
a second end portion that is proximate to the first strip and that comprises an inclined portion,
wherein the connecting plate is configured to connect the first strip to the second strip when the connecting plate slides from the inclined portion to the first end portion, and
wherein the connecting plate is configured to connect to the second strip and to disconnect from the first strip when the connecting plate slides from the linear portion to the second end portion.

4. The beam adjustment assembly of claim 3, wherein either:
the inclined portion is a linear structure and an included angle between the inclined portion and the linear portion is an obtuse angle; or
the inclined portion is an arc inclined portion.

5. The beam adjustment assembly of claim 3, wherein the connecting plate comprises:
a third end portion;
a fourth end portion that is opposite to the third end portion; and
an abutting side wall located between the third end portion and the fourth end portion,
wherein the one or more of the main dielectric slabs are further configured to abut against the third end portion when the main dielectric slabs slide in the first direction,
wherein when the main dielectric slabs slide to the first position, the connecting plate is configured to be located in the inclined portion and the one or more of the main dielectric slabs are configured to abut against the abutting side wall, and
wherein the one or more of the main dielectric slabs are configured to abut against the fourth end portion when the main dielectric slabs slide in the second direction.

6. The beam adjustment assembly of claim 5, wherein the connecting plate further comprises:
a circuit connecting plate located on a first side of the circuit board and configured to connect the first strip to the second strip; and
a locking plate detachably connected to the circuit connecting plate and located on a second side of the circuit board that is opposite to the first side, and
wherein the third end portion and the fourth end portion are located on opposite ends of the circuit connecting plate.

7. The beam adjustment assembly of claim 5, wherein the one or more of the main dielectric slabs comprise:
a first pushing portion;
a second pushing portion that is oppositely disposed to the first pushing portion; and
a pushing side wall,
wherein the first pushing portion is configured to contact the third end portion and to push the connecting plate when the main dielectric slabs slide in the first direction,
wherein, when the main dielectric slabs slide to the first position, the first pushing portion is configured to release from abutting contact with the third end portion and the pushing side wall is configured to contact the abutting side wall and to lock to the connecting plate, and
wherein, when the main dielectric slabs slide in the second direction, the second pushing portion is configured to contact the fourth end portion and to push the connecting plate to slide in the second direction.

8. The beam adjustment assembly of claim 7, wherein the third end portion comprises a first slope guide surface, and wherein the first pushing portion comprises a second slope guide surface cooperating with the first slope guide surface.

9. The beam adjustment assembly of claim 7, wherein the one or more of the main dielectric slabs comprise an avoidance notch configured to cooperate with the connecting plate, wherein the first pushing portion and the second pushing portion are located on two opposite sides of the avoidance notch, wherein when the connecting plate slides in the linear portion, the connecting plate is configured to be partially located in the avoidance notch, and wherein when the connecting plate connects the first strip to the second strip, the connecting plate is configured to be located outside the avoidance notch.

10. The beam adjustment assembly of claim 7, wherein a height of the second pushing portion is greater than a height of the first pushing portion, and wherein the second pushing portion protrudes from the one or more of the main dielectric slabs.

11. The beam adjustment assembly of claim 2, wherein the circuit board further comprises a second sliding slot, and wherein the main dielectric slabs are slidably disposed in the second sliding slot.

12. The beam adjustment assembly of claim 11, wherein the main dielectric slabs comprise a first main dielectric slab and a second main dielectric slab that are disposed on opposite sides of the circuit board.

13. An antenna system, comprising:
a feeding unit;
a plurality of radiating elements arranged in an array and comprising one or more first radiating elements and one or more second radiating elements; and
a beam adjustment assembly comprising:
a phase shifter comprising:
a circuit board comprising:
a first strip connected to the feeding unit and configured to connect to the one or more first radiating elements; and
a second strip that is spaced apart from the first strip and that is configured to connect to the one or more second radiating elements of an antenna; and
main dielectric slabs slidably coupled to the circuit board and configured to slide in a first direction to a first position and to slide in a second direction to a second position, wherein the first direction is opposite the second direction; and
a connecting plate slidably disposed on the circuit board and configured to control an electrical connection between the first strip and the second strip,
wherein one or more of the main dielectric slabs are configured to:
push the connecting plate to connect the first strip to the second strip when the main dielectric slabs slide to the first position; and
push the connecting plate to disconnect the first strip from the second strip when the main dielectric slabs slide to the second position,
wherein the one or more second radiating elements are configured to connect to the feeding unit when the connecting plate connects the first strip to the second strip; and
wherein the one or more second radiating elements are configured to disconnect from the feeding unit when the connecting plate disconnects the first strip from the second strip.

14. The antenna system of claim 13, wherein the circuit board further comprises a first sliding slot, and wherein the connecting plate is slidably disposed in the first sliding slot and is configured to slide in the first direction and the second direction in the first sliding slot.

15. The antenna system of claim 14, wherein the first sliding slot comprises:
a first end portion that is proximate to the second strip and that comprises a linear portion; and
a second end portion that is proximate to the first strip and that comprises an inclined portion,
wherein the connecting plate is configured to connect the first strip to the second strip when the connecting plate slides from the inclined portion to the first end portion, and wherein the connecting plate is configured to connect to the second strip and to disconnect from the first strip when the connecting plate slides from the linear portion to the second end portion.

16. The antenna system of claim 15, wherein either:
the inclined portion is a linear structure and an included angle between the inclined portion and the linear portion is an obtuse angle; or
the inclined portion is an arc inclined portion.

17. The antenna system of claim 15, wherein the connecting plate comprises:
a third end portion;
a fourth end portion that is opposite to the third end portion; and
an abutting side wall located between the third end portion and the fourth end portion,
wherein the one or more of the main dielectric slabs are further configured to abut against the third end portion when the main dielectric slabs slide in the first direction,
wherein when the main dielectric slabs slide to the first position, the connecting plate is configured to be located in the inclined portion and the one or more of the main dielectric slabs are configured to abut against the abutting side wall, and
wherein the one or more of the main dielectric slabs are configured to abut against the fourth end portion when the main dielectric slabs slide in the second direction.

18. The antenna system of claim 17, wherein the connecting plate comprises:
a circuit connecting plate located on a first side of the circuit board and configured to connect the first strip to the second strip; and
a locking plate detachably connected to the circuit connecting plate and located on a second side of the circuit board that is opposite to the first side, and
wherein the third end portion and the fourth end portion are located on opposite ends of the circuit connecting plate.

19. The antenna system of claim 17, wherein the one or more of the main dielectric slabs comprise:
a first pushing portion;
a second pushing portion that is oppositely disposed to the first pushing portion; and
a pushing side wall,
wherein the first pushing portion is configured to contact the third end portion and to push the connecting plate when the main dielectric slabs slide in the first direction,
wherein when the main dielectric slabs slide to the first position, the first pushing portion is configured to release from abutting contact with the third end portion and the pushing side wall is configured to contact the abutting side wall and to lock to the connecting plate, and
wherein when the main dielectric slabs slide in the second direction, the second pushing portion is configured to contact the fourth end portion and to push the connecting plate to slide in the second direction.

20. The antenna system of claim 19, wherein the third end portion comprises a first slope guide surface, and wherein the first pushing portion comprises a second slope guide surface cooperating with the first slope guide surface.

21. The antenna system of claim 19, wherein the one or more of the main dielectric slabs comprise an avoidance notch configured to cooperate with the connecting plate, wherein the first pushing portion and the second pushing portion are disposed on two opposite sides of the avoidance notch, wherein when the connecting plate slides in the linear portion, the connecting plate is configured to be partially located in the avoidance notch, and wherein when the connecting plate connects the first strip to the second strip, the connecting plate is configured to be located outside the avoidance notch.

22. The antenna system of claim 19, wherein a height of the second pushing portion is greater than a height of the first pushing portion, and wherein the second pushing portion protrudes from the one or more of the main dielectric slabs.

23. The antenna system of claim 14, wherein the circuit board comprises a second sliding slot, and wherein the main dielectric slabs are slidably disposed in the second sliding slot.

24. The antenna system of claim 23, wherein the main dielectric slabs comprise a first main dielectric slab and a second main dielectric slab, and wherein the first main dielectric slab and the second main dielectric slab are arranged on opposite sides of the circuit board.

25. A base station, comprising:
    an antenna comprising a beam adjustment assembly that comprises:
        a phase shifter comprising:
            a circuit board comprising a first strip and a second strip that are spaced apart from each other and that are configured to respectively connect to radiating elements of an antenna; and
            main dielectric slabs slidably coupled to the circuit board and configured to slide in a first direction to a first position and to slide in a second direction to a second position, wherein the first direction is opposite the second direction; and
        a connecting plate slidably disposed on the circuit board and configured to control an electrical connection between the first strip and the second strip,
    wherein one or more of the main dielectric slabs are configured to:
        push the connecting plate to connect the first strip to the second strip when the main dielectric slabs are slidingly moved in the first direction to the first position; and
        push the connecting plate to disconnect the first strip from the second strip when the main dielectric slabs are slidingly moved in the second direction to the second position.

* * * * *

UNITED STATES PATENT AND TRADEMARK OFFICE
CERTIFICATE OF CORRECTION

PATENT NO. : 11,955,720 B2
APPLICATION NO. : 17/843419
DATED : April 9, 2024
INVENTOR(S) : Huabing Su et al.

Page 1 of 1

It is certified that error appears in the above-identified patent and that said Letters Patent is hereby corrected as shown below:

On the Title Page

Page 2, (56) References Cited, Foreign Patent Documents: "IN 109921157 A 6/2019" should read "CN 109921157 A 6/2019"

In the Claims

Claim 13, Column 15, Lines 23 and 24: "elements of an antenna; and" should read "elements; and"

Claim 13, Column 15, Line 45: "strip; and" should read "strip, and"

Signed and Sealed this
Fourteenth Day of May, 2024

Katherine Kelly Vidal
*Director of the United States Patent and Trademark Office*